United States Patent
Knauft

(10) Patent No.: US 9,198,158 B2
(45) Date of Patent: Nov. 24, 2015

(54) PREDICTIVE PAGING BASED ON MOBILITY HISTORY AND MOVEMENT PATTERNS

(75) Inventor: James P. Knauft, Warrenville, IL (US)

(73) Assignee: Alcatel Lucent, Boulogne-Billancourt (FR)

( * ) Notice: Subject to any disclaimer, the term of this patent is extended or adjusted under 35 U.S.C. 154(b) by 776 days.

(21) Appl. No.: 13/481,134

(22) Filed: May 25, 2012

(65) Prior Publication Data

US 2013/0316706 A1    Nov. 28, 2013

(51) Int. Cl.
*H04W 68/04* (2009.01)
*H04W 8/04* (2009.01)

(52) U.S. Cl.
CPC ............... *H04W 68/04* (2013.01); *H04W 8/04* (2013.01)

(58) Field of Classification Search
CPC ..... H04W 68/04; H04W 68/00; H04W 36/00; H04W 60/00; H04W 68/02
USPC ............................................. 455/435.1, 458
See application file for complete search history.

(56) References Cited

U.S. PATENT DOCUMENTS

| | | | |
|---|---|---|---|
| 6,711,408 B1 | 3/2004 | Raith | |
| 8,274,932 B2 * | 9/2012 | Iovieno et al. | 370/328 |
| 8,378,814 B2 * | 2/2013 | Xiong et al. | 340/539.13 |
| 8,565,795 B2 * | 10/2013 | Yin et al. | 455/458 |
| 8,755,808 B2 * | 6/2014 | Knauft et al. | 455/450 |
| 8,787,958 B2 * | 7/2014 | Yin et al. | 455/515 |
| 8,837,359 B2 * | 9/2014 | Yin et al. | 370/328 |
| 2010/0020764 A1 | 1/2010 | Yamamoto et al. | |
| 2010/0210288 A1 * | 8/2010 | Kim et al. | 455/458 |
| 2010/0323715 A1 * | 12/2010 | Winters | 455/456.1 |
| 2011/0105153 A1 * | 5/2011 | Miklos et al. | 455/456.5 |
| 2011/0171979 A1 * | 7/2011 | Rune | 455/458 |
| 2011/0210845 A1 * | 9/2011 | Xiong et al. | 340/539.13 |
| 2011/0261715 A1 * | 10/2011 | Norefors et al. | 370/252 |
| 2012/0071173 A1 * | 3/2012 | Olsson et al. | 455/456.1 |
| 2012/0115515 A1 * | 5/2012 | Lopez et al. | 455/458 |
| 2014/0135044 A1 * | 5/2014 | Bergqvist et al. | 455/458 |

FOREIGN PATENT DOCUMENTS

| | | |
|---|---|---|
| EP | 2360969 | 8/2011 |
| WO | 2012041732 | 4/2012 |

OTHER PUBLICATIONS

Prasannakumar, J.M. et al; Intelligent Handoff in Cellular Data Networks Based on Mobile Positioning; Proceedings of the 5th WSEAS International Conference on Information Science, Communications and Applications; ISCA 2005; WSEAS: World Scientific and Engineering Academy and Society; Cancun, Mexico; May 11-14, 2005.

\* cited by examiner

*Primary Examiner* — Khawar Iqbal
(74) *Attorney, Agent, or Firm* — Patti & Malvone Law Group, LLC

(57) ABSTRACT

A method and apparatus for efficient paging of user equipment (UE) in an LTE network is disclosed. In addition to storing the Last Seen eNodeB (LSeNB) for each UE attached to a mobility management entity (MME), the MME also maintains an LSeNB List of the eNodeBs seen immediately before the LSeNB for each UE. When a notification for a UE arrives at the MME, then MME can select from several paging methods, including paging only the LSeNB to locate the UE and sending a paging request LSeNB as well as to the list of eNodeBs seem immediately before the LSeNB. The MME can send a paging request to more than a single eNodeB but less than a full Tracking Area. Efficient paging is especially needed for voice over internet protocol (VoIP) calls where a call will go to voice mail if a page isn't answered quickly.

15 Claims, 4 Drawing Sheets

PREDICTIVE PAGING BASED ON MOBILITY HISTORY AND MOVEMENT PATTERNS

This invention relates generally to tracking user equipment in a long term evolution network and more particularly to efficient paging of user equipment.

BACKGROUND

A service area of a wireless telecommunications network is typically broken up into contiguous geographic regions called cells. In 4G networks, commonly known a long term evolution (LTE) networks, each cell is associated with an eNodeB (eNB), or base station and each cell is assigned to a tracking area. A cell is associated with a specific geographic service area and multiple cells can be associated with a specific tracking area. Also, an eNodeB may be associated with more than one cell. Consequently, a tracking area covers a geographic service area made up of the set of cells that are assigned to that tracking area. A mobility management entity (MME), similarly to an MSC in a 3G network, is responsible for managing the communications of UEs through a plurality of eNBs in one or more tracking areas.

As each UE moves through a geographic area, it transmits a tracking are update (TAU) request when it detects that it has entered a tracking area where it is not registered. The MME associated with the tracking area receives the TAU requests and maintains a record with information associated with the UE. When the MME receives a request to connect with a registered UE, the MME sends out a paging request to alert the UE that a connection is desired.

LTE providers have found that they need to increase the size of tracking areas in order to reduce the frequency of TAU procedures. In other words, if UEs change their tracking area less often, fewer TAU procedures will be using communication bandwidth. Unfortunately, while this increase in the size of tracking areas reduces the number of TAU procedures performed, it significantly increases the amount of paging traffic that must be handled by each eNodeB for connecting with individual UEs. Typically, the last seen eNodeB is part of the information the MME maintains for each UE and when a request to connect is received, the MME initially sends a paging request to this eNodeB. If the paging request fails, however, the MME then sends a paging request to all the eNodeBs within the same tracking area as the last seen eNodeB. If this paging request fails, a paging request can be sent out to all the eNBs in the same tracking area as well as one or more neighboring tracking areas. As the size of tracking areas increases, they encompass more eNodeBs and each eNodeB receives more paging requests.

Thus, a need exists for to support paging of more than a single eNodeB but less than a full Tracking Area. There is also a need to select a subset of eNodeBs to be paged where the UE is most likely to be present. The need for efficient paging is especially acute with regard to voice over internet protocol (VoIP) calls where a call will go to voice mail if a paging request isn't answered in a given amount of time.

SUMMARY

This section will be corrected when claims are finalized. The invention in one implementation encompasses a method and apparatus for improving paging in an LTE network. An MME maintains a small list of several last seen eNodeBs for each UE in the order in which they were visited, newest to oldest.

In one embodiment, there is provided a method, executed in a wireless network having base stations and wireless mobility managers controlling the base stations, which includes the steps of maintaining a Last Seen list of one or more base stations in the order in which they were visited by a user equipment (UE) for each UE attached to the wireless mobility managers, receiving a message requesting access to a requested UE, sending a first paging request to the base stations on the Last Seen list for the requested UE and if that paging request fails, sending a second paging request to a larger group of base stations.

In another embodiment, there is provided method of paging a user equipment (UE) using at least one mobility management entity (MME) operatively coupled to a plurality of eNodeBs (eNBs) in a LTE (Long Term Evolution) network, which includes the steps of maintaining a last seen eNB list of one or more eNBs in the order in which they were last seen by a user equipment for each UE attached to the MME, receiving a notification requesting access to a requested UE, sending a first paging request to the one or more eNBs on the last seen eNB list and if the first paging request fails, sending a second paging request to a larger group of eNBs.

Some embodiments of the above methods further include wherein the length of the list may be flexibly provisioned with the maximum number of eNBs to be paged.

Some embodiments of the above methods further include wherein the list of one or more eNBs is maintained so that it does not contain any duplicate entries.

Some embodiments of the above methods further include wherein the list is cleared when a UE reattaches to the wireless mobility managers.

Some embodiments of the above methods further include wherein a plurality of eNBs are grouped into tracking areas and a UE is capable of moving between eNBs within one tracking area, or between eNBs in different tracking areas.

Some embodiments of the above methods further include wherein the first and second paging requests are related to paging methods in a paging policy table, the method further including the steps of maintaining a paging policy table for the MME that determines which one or more paging methods are used in response to different types of notifications and accessing the paging policy table when a notification is received to determine how one or more paging methods to follow, said paging methods including any of accessing the last seen eNB, accessing a list of the last seen eNBs, accessing the last seen tracking area and accessing the last seen tracking area and neighboring tracking areas.

Some embodiments of the above methods further include the steps of maintaining a database of UE mobility patterns, said database storing the number of times one eNB is visited immediately after another eNB for pairs of eNBs within a set, generating a mobility patterns list, in response to the notification request, of likely eNBs the requested UE would visit by accessing the database with the requested UE's most recently visited eNB, and combining the last seen eNB list and the mobility pattern list into a final list for use in selecting eNBs to receive the first paging request for the requested UE.

Some embodiments of the above methods further include the step of accessing the database of UE mobility patterns with information indicating the last known direction of movement of the requested UE.

Some embodiments of the above methods further include wherein the database of UE mobility patterns is organized according to time of day and the step of generating a supplemental list further includes the step of accessing the database of UE mobility patterns to retrieve mobility data for the same time of day as the current time.

Some embodiments of the above methods further include wherein the paging method used for the first paging request can vary based on the type of notification.

In another embodiment, there is provided as apparatus for use in an LTE network for paging a user equipment (UE) using at least one mobility management entity (MME), said apparatus configured to perform the steps of maintaining a last seen eNB list of one or more eNBs in the order in which they were last seen by a user equipment for each UE attached to the MME, receiving a notification requesting access to a requested UE, sending a first paging request to the one or more eNBs on the last seen eNB list and if that paging request fails, sending a second paging request to a larger group of eNBs.

DESCRIPTION OF THE DRAWINGS

Features of example implementations of the invention will become apparent from the description, the claims, and the accompanying drawings in which:

DETAILED DESCRIPTION

Figure 1:
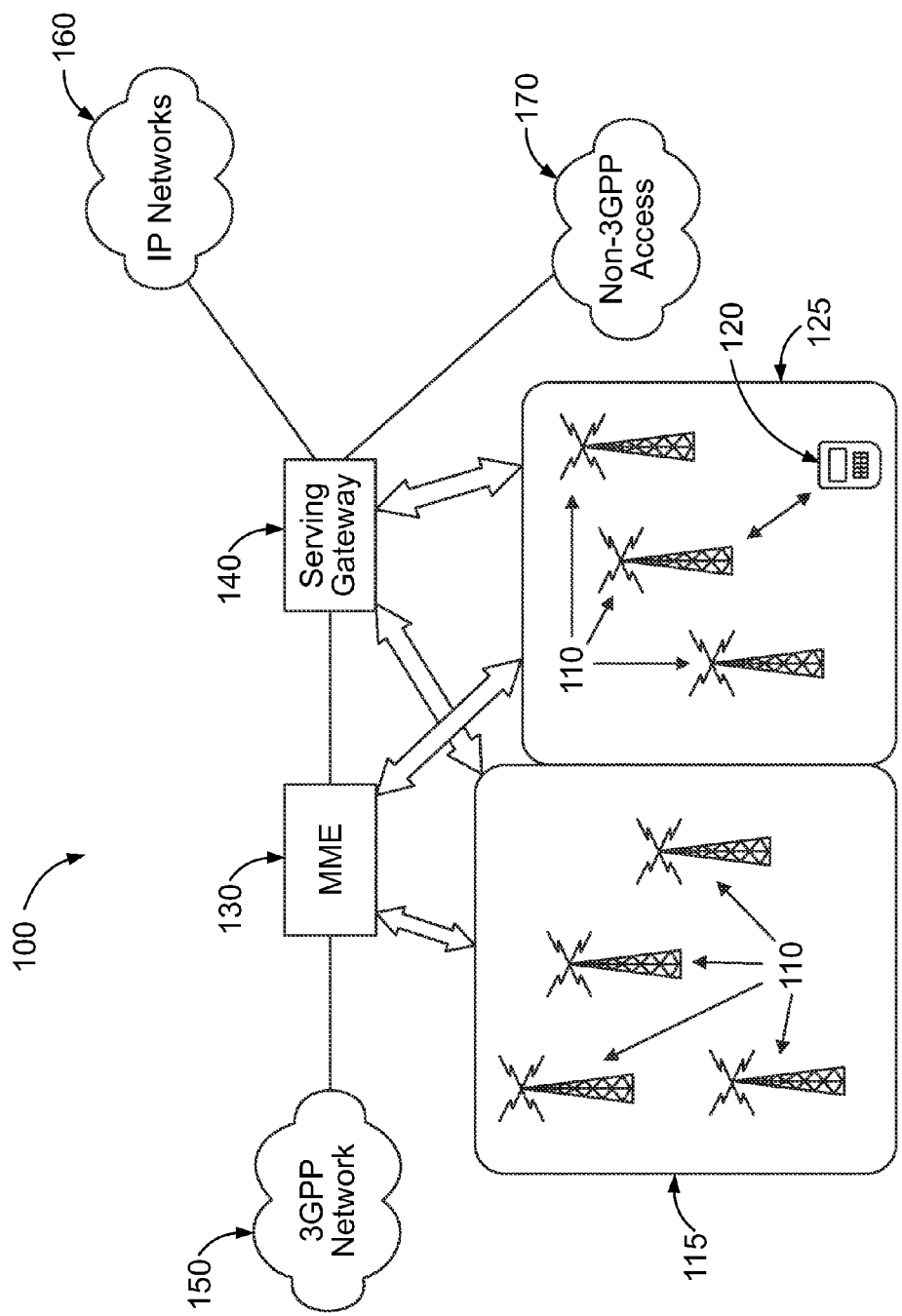
FIG. 1 is a representation of one implementation of an apparatus that comprises that performs an efficient paging process.

A high level view of LTE network 100 is depicted in FIG. 1. Network 100 is not a full LTE network but only depicts a few elements that may be used during paging of a wireless device that allows service on LTE network. Such a wireless device is known as a UE (user equipment) in LTE terminology." At a basic level, an LTE network includes a plurality of eNodeBs (eNBs) 110 or base stations, which are responsible for handling communications with UEs in a certain geographic region. A representative UE is shown at 120. The eNodeBs is associated with one or more cells, and each cell is assigned to a tracking area. A cell is associated with a specific geographic service area and multiple cells can be associated with a specific tracking area. Consequently, a tracking area covers a geographic service area made up of the set of cells that are assigned to that tracking area. In FIG. 1, several eNodeBs 110 are shown grouped into tracking areas 115 and 125. Since cells associated with different tracking areas may be assigned to a single eNodeB, it is also possible that an eNodeB 110 may appear in two different tracking areas. Also, the number of eNodeBs in each tracking area is just an example. Typically, tracking areas may include a flexible number of eNodeBs. Each eNodeB 110 may be communicatively coupled via a backhaul connection with a mobile management entity (MME) 130 and a serving gateway (SGW) 140. The MME 130 and SGW 140 may be nodes in the network 100 or they may be physical computer components, such as a circuit board, that reside on a computer node in the network 100. The functions of the MME 130 and serving gateway 135 as described herein may be implemented in hardware, firmware or software in combination with associated hardware. The MME 130 may perform UE paging operations and it may also perform interoperability functionality with 3GPP networks 140. The SGW 135 may act as a mobility anchor during inter eNodeB handovers, provide interoperability communication with non-3GPP networks 150 and forward user data packets to various IP networks 145.

As the UE 120 moves through the network 100, the UE 120 may perform tracking area update procedures. That is, when the UE 120 detects that it is in a new tracking area, the UE 120 may send a tracking area update (TAU) request to the MME 130 to inform the MME 130 of the UE's 120 new location. If UE 120 is within tracking area 125 and transmits a tracking area update request, one of the eNodeBs 110 may receive the message, and forward the message to the MME 130 and the MME 130 may save the location of the UE 120 as within tracking area 120. The MME also saves an ID of the eNodeB which forwarded the message. This is referred to as the "Last Seen eNodeB." Whenever the UE 120 is attached to an LTE network—that is, the UE 120 has successfully registered with the MME 130—the UE 120 transmits a TAU request when the UE 120 detects that it has entered a tracking area where it is not currently registered. Upon receipt of a TAU request, the MME 130 notes the tracking area and eNodeB where the UE 120 has registered. MME 130 also stores the eNodeB ID that is reported during other procedures such as Service Request and Handover.

Figures 2, 3:
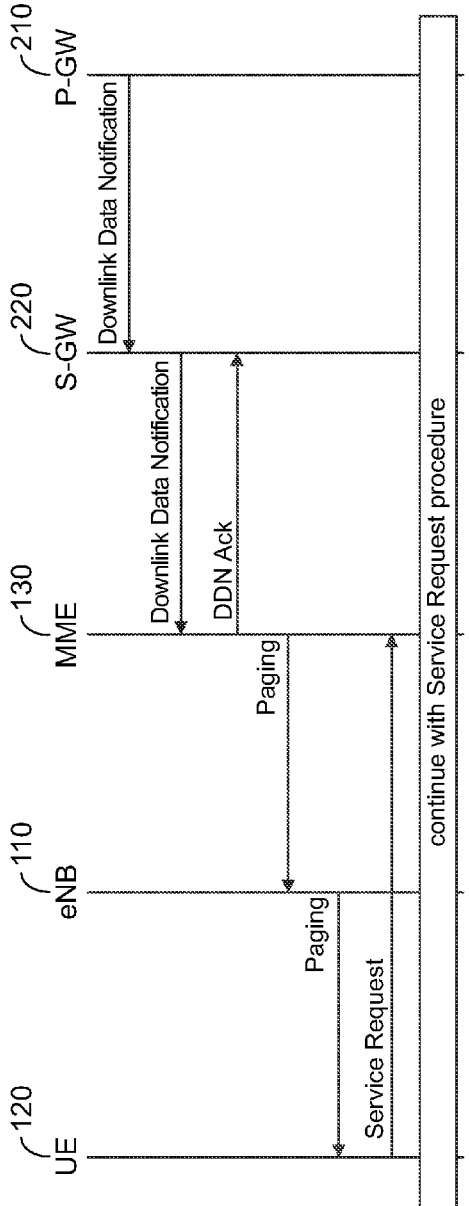
FIG. 2 is a representation of on message flow for the paging procedure of the apparatus of FIG. 1.
FIG. 3 is a representation of the mobility pattern data derived using the apparatus of FIG. 1.

FIG. 2 depicts the general message flow for a paging procedure. A DDN for a particular UE 120 is sent from a Packet Gateway (P-GW) 210 to a Signaling Gateway (S-GW) 220 when there is data available for UE 120. This could comprise an incoming voice call, incoming text message, notification for a social networking app, etc. S-GW 130 forwards the DDN to MME 130. Then MME 130 sends a paging request to the Last Seen eNodeB which is registered to UE 120. If UE 120 is still in the cell served by eNodeB 110, it receives the paging request and returns a service request to MME 130. In response to the service request, MME 130 returns a DDN Acknowledge signal to S-GW 220 and transfer of the data proceeds.

If UE 120 has moved and is no longer served by the Last Seen eNodeB known to MME 130, the UE will fail to respond to the initial page attempt and MME 130 will need to continue the paging process with additional page attempts. Typically, MME 130 will perform a series of page attempts as necessary, gradually expanding the size of the area in which the UE is paged. The set of eNodeBs where the UE is paged is a function of the paging method that has been specified for each page attempt within a Paging Policy table. As an example, when a paging request to the Last Seen eNodeB fails to reach UE 120, the next policy in the Paging Policy table could require MME 130 to send the paging request to all eNodeBs 110 in the Last Seen Tracking Area. As another example, if this second paging attempt fails, MME 130 could move to a third paging process that sends the paging request to all eNodeBs in the Last Seen Tracking Area as well its neighboring tracking areas. This would result in a very large amount of paging traffic in the LTE network.

In a preferred embodiment, a new paging method called the Last Seen eNB List method is provided. For this method, the MME 130 maintains a small list of Last Seen eNodeBs which are paged instead of just the single Last Seen eNB. Allowing MME 130 to page more than one eNodeB 110 but less than all the eNodeBs in an entire tracking area allows MME 130 to reach UE 120 with relatively high effectiveness without generating an excessive amount of paging message traffic. As explained above, an MME can flexibly use a variety of paging methods to respond to a notification for accessing a UE. The specific sequence of paging methods is stored in the Paging Policy Table. It is also possible to adjust the Paging Policy Table based on the type of notification received. For some types, a single Last Seen eNB may be paged, followed by the Last Seen Tracking Area, then the Last Seen Tracking Area and its neighbors. It is also possible that MME 130 will use the Last Seen eNodeB List paging method in place of the Last Seen eNodeB paging method in cases where MME 130 needs to be more aggressive in its paging efforts (e.g., paging for incoming VoIP calls). The Paging Policy Table may be flexibly configured in a variety of ways, including the number of eNBs to maintain on the Last Seen eNB List.

For the Last Seen eNodeB List paging method, MME 130 constructs a list of eNodeBs 110 based on the UE 120 mobility history in terms of the eNodeBs that have served the UE. Paging this subset of eNodeBs is effective because UEs will frequently return to previously visited eNodeBs due to a variety of factors such as RF toggling and the high relative occurrence of "round trips" in movement patterns within a cellular network (i.e., cyclical movement).

The MME 130 shall track the mobility history of each UE by saving the following information:
 a. The last seen eNodeB (i.e., the current eNodeB that was serving the UE during the last mobility-related procedure)
 b. The old last seen eNodeB (i.e., the eNodeB where the UE was observed prior to the last one)
 c. The older last seen eNodeB (i.e., the eNodeB where the UE was observed prior to the old last seen eNodeB)

Please note that MME 130 will manage this information to ensure that these values are unique. Duplicate values are not saved. Any old mobility history is cleared when the UE re-attaches to the LTE network or when UE 120 returns from another MME.

The Last Seen eNodeB List is generated using the collected mobility history. The length of Last Seen eNodeB List should be configurable. For example, if the maximum length of Last Seen eNodeB List is 1, then only the 'last seen eNodeB' will be included. If the maximum length of Last Seen eNodeB List is 3, then it may include the 'last seen eNodeB', the 'old last seen eNodeB', and the 'older last seen eNodeB'. For larger maximum lengths, the list would be extended similarly.

In a further embodiment, MME 130 creates a Mobility Pattern List of eNodeBs that have a higher likelihood of successfully completing a paging request. This Mobility Pattern List can be combined with the Last Seen eNodeB List to create a list of a somewhat larger group of eNodeBs that is still smaller than the total number of eNodeBs in a tracking area. The Mobility Pattern List contains the set of eNodeBs that are the most likely next eNodeB to be visited based on the movement patterns for all UEs served by the MME 130. While the Last Seen eNodeB List accounts for the high relative occurrence of "round trips" in movement patterns within a cellular network (i.e., cyclical movement), the Mobility Pattern List accounts for forward movement of a UE through a service area, i.e., linear movement such as moving along a highway or commuter rail line.

To generate the Mobility Pattern List, MME 130 analyzes the mobility patterns for UEs served by an eNodeB by tracking the number of times eNodeB 'Y' was visited when the 'last seen eNodeB was eNodeB 'X'. This information can be collected for an entire day or for specific periods of the day. This compiled data of mobility patterns can then be used to construct the top ranked 'next likely' eNodeB for predicting where the UE may have moved. An example of the data structure which could store the information regarding mobility patterns for a set of 8 eNodeBs is shown in FIG. 3. This figure is a representation of the mobility pattern data derived using the apparatus of FIG. 1 and illustrates the relatively frequency of movement of UEs between specific eNodeBs. The full data set of mobility pattern data would cover all eNodeBs associated with the MME 130 and would include data from all UEs served by the MME 130.

The Mobility Pattern List is generated using the top ranked 'next likely' eNodeBs for a UE based on its 'last seen eNodeB' value and mobility pattern data from the data structure of FIG. 3. The length of the Mobility Pattern List should be configurable. For example, if the maximum length of the Mobility Pattern List is 1, then only the top ranked 'next eNodeB' will be included in the Mobility Pattern List. If the Mobility Pattern List length is 7, then the top 7 'next likely' eNodeBs will be included. Inter-eNB mobility data would be collected for all eNBs served by the MME and could be generated using Per-Call Measurement Data (PCMD) collected by MME 130.

An example of the generation of the Last Seen eNodeB List and the Supplemental List will now be described in conjunction with the data structure of FIG. 3.

Assume the following parameter values for Predictive eNB Paging (are in use:
 Max Last Seen eNodeB List Length=2
 Max Supplemental List Length=4
 Assume the UE's mobility history is as follows:
 Last Seen eNB=1
 Old Last Seen eNB=4
 Older Last Seen eNB=6
 Given this scenario, the sublists and final eNB paging lists would be as follows:
 eNB Last Seen eNodeB List=1, 4
 eNB Supplemental List=2, 4, 5, 7

A combination of the Last Seen eNodeB List and the Mobility Pattern List causes MME 130 to page eNBs 1, 2, 4, 5 and 7. Duplicates between the two lists will be eliminated. It should be noted that the Last Seen eNodeB List and the Mobility Pattern List can be used together or each can be used alone to accomplish an embodiment.

Figure 4:
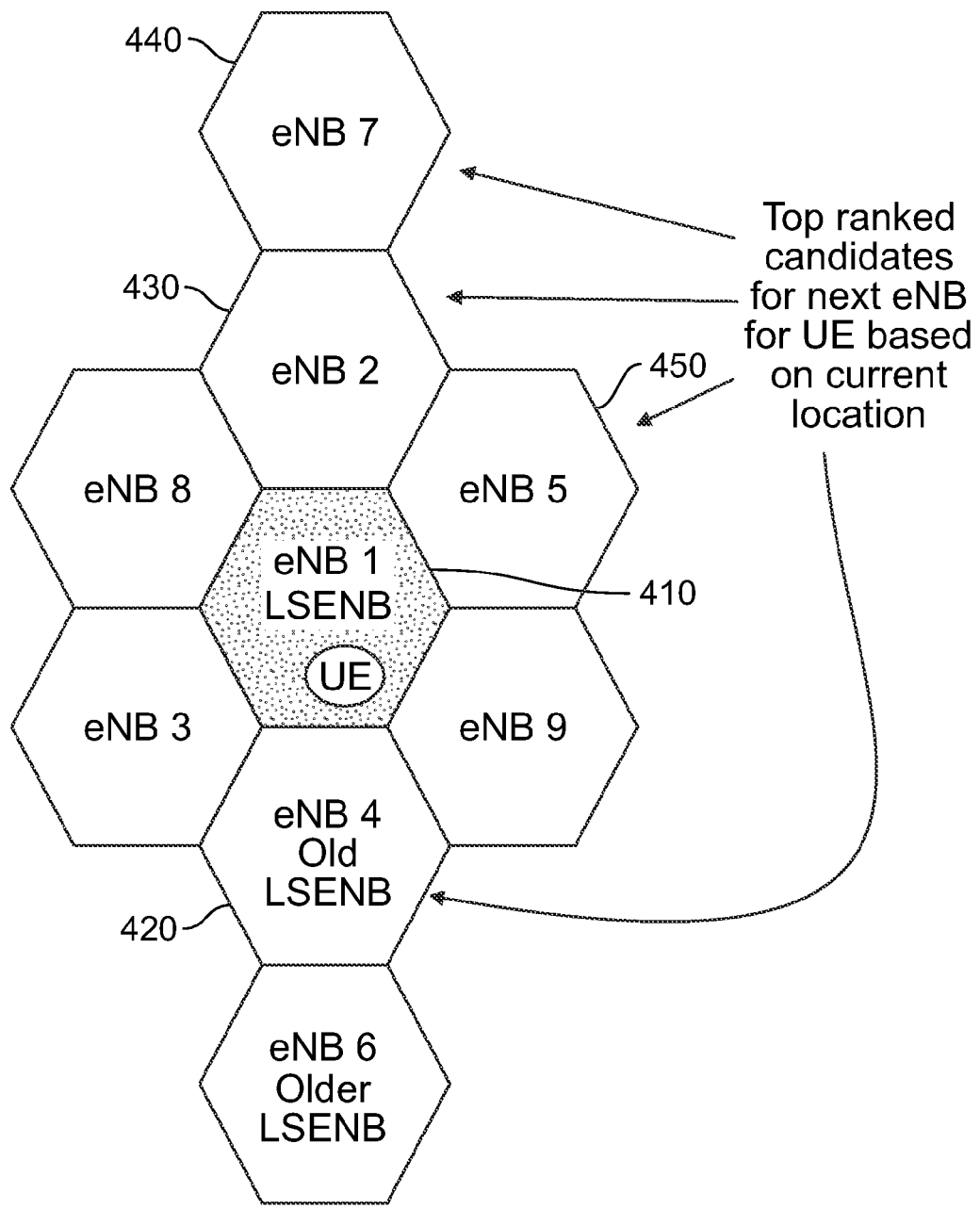
FIG. 4 is a representation of partial view of the geographic service area supported by the apparatus of FIG. 1.

FIG. 4 depicts an arrangement of eNodeBs that further illustrates the example given above. Assume for example that a major road runs through the service areas of eNBs 7, 3, 1, 4 and 6. If the Last Seen eNodeB for a UE is eNB 1 in service area 410, then the most likely eNBs for the UE to travel to next would be eNB4 in service area 420, eNB2 in service area 430, eNB7 in service area 440 and eNB5 in service area 450. This configuration is shown in the mobility patterns in row 1 of the data structure of FIG. 3. The inclusion of eNB5 in service area 450 could be due to the presence of an exit on the major road.

In another embodiment, the mobility patterns used to generate the Mobility Pattern List may take into consideration the last known direction of movement in addition to the last known position when processing data for the generation of the Mobility Pattern List. In other words, the top 'next likely' eNodeBs would be retrieved for the case where the last known position (i.e., last seen eNodeB) is 'Y' and the previous location before that (i.e., old last seen eNodeB) was 'X'.

As a further embodiment, the Mobility Pattern List may be generated while taking into consideration the current time, thus utilizing only mobility history data when generating the Supplemental List that is from the current time of day (e.g., morning rush hour, evening rush hour, late night, etc).

Figure 5:
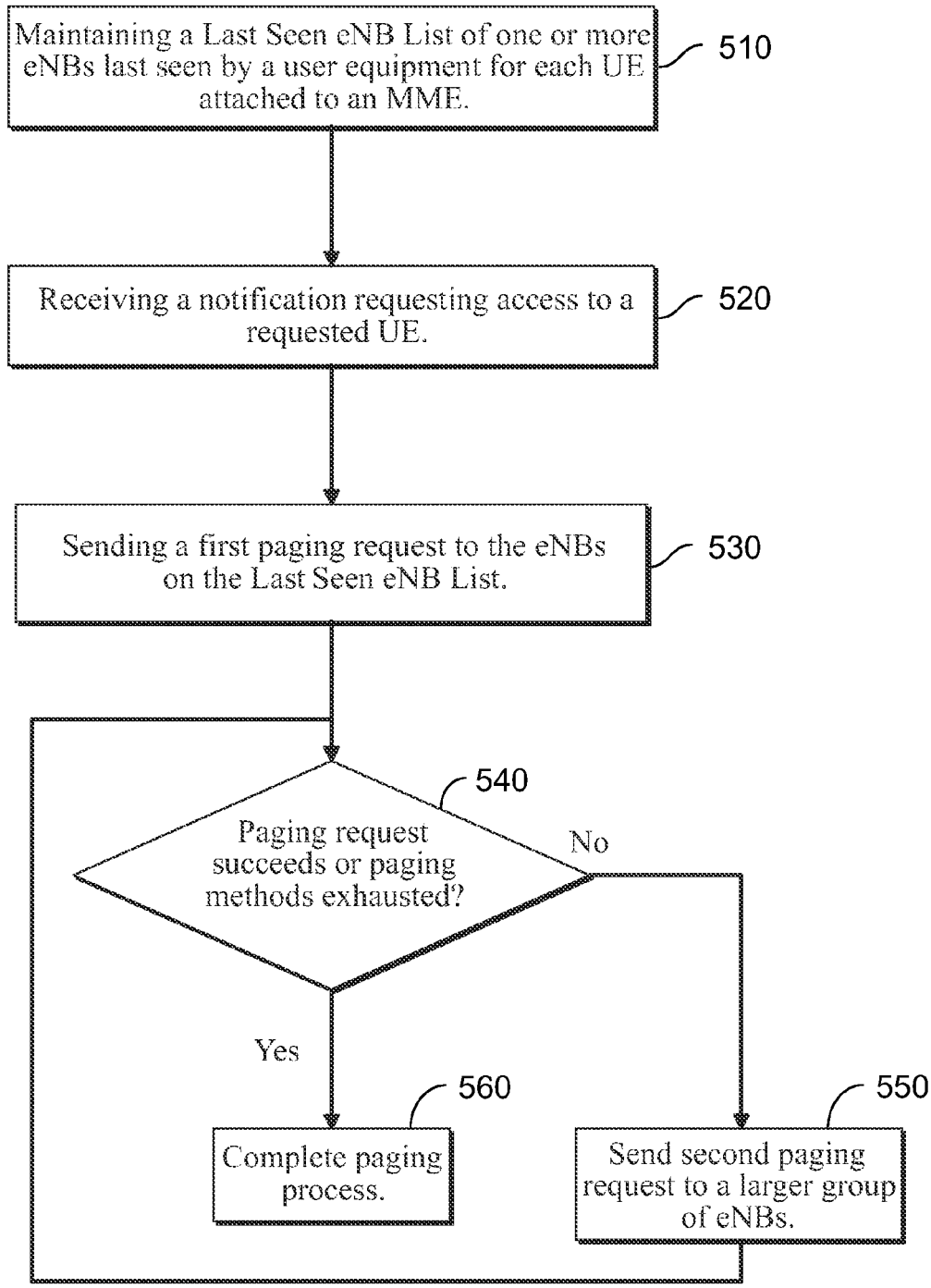
FIG. 5 is a flow chart depicting the operation of the apparatus of FIG. 1.

An illustrative description of operation of the apparatus 100 is presented, for explanatory purposes in connection with FIG. 5. As shown in step 510, an MME maintains a Last Seen eNB List of one or more of the last seen eNBs for each UE attached to the MME. When the MME received a notification requesting access to a UE in step 520, it sends a paging request to the Last Seen eNB in step 530. If that paging request does not succeed in step 540, a second paging request is sent to a larger group of eNBs, either all the eNBs in the Last Seen Tracking Area or all the eNBs in the Last Seen Tracking Area as well as adjacent tracking areas in step 550. Once a paging request succeeds or the possible paging methods are exhausted, the paging process is completed in step 560.

The apparatus 100 in one example comprises a plurality of components such as one or more of electronic components, hardware components, and computer software components. A number of such components can be combined or divided in the apparatus 100. An example component of the apparatus 100 employs and/or comprises a set and/or series of computer instructions written in or implemented with any of a number of programming languages, as will be appreciated by those skilled in the art.

The steps or operations described herein are just for example. There may be many variations to these steps or operations without departing from the spirit of the invention. For instance, the steps may be performed in a differing order, or steps may be added, deleted, or modified.

Although example implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

I claim:

1. A method, executed in a wireless network having base stations and wireless mobility managers controlling the base stations, comprising the steps of:
    maintaining a database of user equipment (UE) mobility patterns, said database storing at least a Last Seen list of one or more base stations in the order in which they were visited by the user equipment (UE) for each UE attached to the wireless mobility managers and the number of times one base station is visited immediately after another base station for pairs of base stations within a set;
    receiving a message requesting access to a requested UE;
    maintaining a paging policy table for the wireless mobility managers that determines which of one or more paging methods are used in response to different types of notifications, said paging methods including any of accessing the Last Seen base station, accessing a list of the Last Seen base stations, accessing the Last Seen tracking area and accessing the Last Seen tracking area and neighboring tracking areas;
    accessing the paging policy table when a message requesting access to the UE is received to determine which one or more paging methods to follow;
    generating a mobility pattern list, in response to the notification request, of likely base stations the requested UE would visit by accessing the database with the requested UE's most recently visited base station; and
    combining the mobility pattern list with the Last Seen list for the requested UE to determine which base stations receive a first paging request;
    sending the first paging request to the base stations on the Last Seen list for the requested UE; and
    if that paging request fails, sending a second paging request to a larger group of base stations in accordance with the paging policy table.

2. The method of claim 1 wherein the length of the list may be flexibly provisioned with the maximum number of base stations to be paged.

3. The method of claim 1 wherein the list of one or more base stations is maintained so that it does not have any duplicate entries.

4. The method of claim 1 wherein the list is cleared when a UE reattaches to the wireless mobility managers.

5. A method of paging a user equipment (UE) using at least one mobility management entity (MME) operatively coupled to a plurality of eNodeBs (eNBs) in a LTE (Long Term Evolution) network, comprising the steps of:
    maintaining a database of UE mobility patterns, said database storing at least a last seen eNB list of one or more eNBs in the order in which they were last seen by a user equipment for each UE attached to the MME and the number of times one eNB is visited immediately after another eNB for pairs of eNBs within a set;
    receiving a notification requesting access to a requested UE;
    maintaining a paging policy table for the MME that determines which one or more paging methods are used in response to different types of notifications, said paging methods including any of accessing the last seen eNB, accessing a list of the last seen eNBs, accessing the last seen tracking area and accessing the last seen tracking area and neighboring tracking areas;
    accessing the paging policy table when a notification is received to determine which one or more paging methods to follow;
    generating a mobility patterns list, in response to the notification request, of likely eNBs the requested UE would visit by accessing the database with the requested UE's most recently visited eNB;
    combining the last seen eNB list and the mobility pattern list into a final list for use in selecting eNBs to receive a first paging request for the requested UE;
    sending the first paging request to the one or more eNBs on the last seen eNB list; and
    if the first paging request fails, sending a second paging request to a larger group of eNBs in accordance with the paging policy table.

6. The method of claim 5 wherein the length of the list may be flexibly provisioned with the maximum number of eNBs to be paged.

7. The method of claim 5 wherein the last seen eNB list is maintained so that it does not contain any duplicate entries.

8. The method of claim 5 wherein a plurality of eNBs are grouped into tracking areas and a UE is capable of moving between eNBs within one tracking area, or between eNBs in different tracking areas.

9. The method of claim 5 wherein the step of generating a mobility pattern list further includes the step of:
    accessing the database of UE mobility patterns with information indicating the last known direction of movement of the requested UE.

10. The method of claim 5 wherein the database of UE mobility patterns is organized according to time of day and the step of generating the mobility pattern list further includes the step of:
    accessing the database of UE mobility patterns to retrieve mobility data for the same time of day as the current time.

11. The method of claim 5 wherein the paging method used for the first paging request can vary based on the type of notification.

12. An apparatus for use in an LTE network for paging a user equipment (UE) using at least one mobility management entity (MME), said apparatus configured to perform the following steps:

maintaining a database of UE mobility patterns, said database storing at least a last seen eNB list of one or more eNBs in the order in which they were last seen by a user equipment for each UE attached to the MME and the number of times one eNB is visited immediately after another eNB for pairs of eNBs within a set;

receiving a notification requesting access to a requested UE;

maintaining a paging policy table for the MME that determines which of one or more paging methods are used in response to different types of notifications, said paging methods including any of accessing the last seen eNB, accessing a list of the last seen eNBs, accessing the last seen tracking area and accessing the last seen tracking area and neighboring tracking areas;

accessing the paging policy table when a notification is received to determine which one or more paging methods to follow;

generating a mobility pattern list, in response to the notification request, of likely eNBs the requested UE would visit by accessing the database with the requested UE's most recently visited eNB; and combining the last seen eNB list and the mobility pattern list into a final list for use in selecting eNBs to receive a first paging request for the requested UE;

sending the first paging request to the one or more eNBs on the last seen eNB list; and if that paging request fails, sending a second paging request to a larger group of eNBs in accordance with the paging policy table.

13. The apparatus of claim 12 wherein the length of the list may be flexibly provisioned with the maximum number of eNBs to be paged.

14. The apparatus of claim 12 wherein the list of one or more eNBs is maintained so that the list does not contain any duplicate entries.

15. The method of claim 12 wherein the step of generating a mobility pattern list further includes the step of:

accessing the database of UE mobility patterns with information indicating the last known direction of movement of the requested UE; or accessing the database of UE mobility patterns to retrieve mobility data for the same time of day as the current time.

* * * * *